US010472289B2

(12) United States Patent
Wing

(10) Patent No.: US 10,472,289 B2
(45) Date of Patent: Nov. 12, 2019

(54) METHOD OF FIRING A CERAMIC HONEYCOMB BODY

(71) Applicant: CORNING INCORPORATED, Corning, NY (US)

(72) Inventor: Douglas Richard Wing, Corning, NY (US)

(73) Assignee: Corning Incorporated, Corning, NY (US)

( * ) Notice: Subject to any disclaimer, the term of this patent is extended or adjusted under 35 U.S.C. 154(b) by 59 days.

(21) Appl. No.: 15/572,217

(22) PCT Filed: May 3, 2016

(86) PCT No.: PCT/US2016/030493
§ 371 (c)(1),
(2) Date: Nov. 7, 2017

(87) PCT Pub. No.: WO2016/179130
PCT Pub. Date: Nov. 10, 2016

(65) Prior Publication Data
US 2018/0148382 A1    May 31, 2018

Related U.S. Application Data

(60) Provisional application No. 62/158,245, filed on May 7, 2015.

(51) Int. Cl.
*C04B 35/638* (2006.01)
*C04B 38/00* (2006.01)
(Continued)

(52) U.S. Cl.
CPC ...... *C04B 38/0006* (2013.01); *B01D 46/0001* (2013.01); *B01D 46/2418* (2013.01);
(Continued)

(58) Field of Classification Search
CPC .............. C04B 35/638; C04B 38/0006; B01D 46/0001; B01D 46/2418; B01J 35/04; B01J 37/08
See application file for complete search history.

(56) References Cited

U.S. PATENT DOCUMENTS 5,183,609 A * 2/1993 Miyahara ................ C04B 35/64
264/177.12
6,027,684 A * 2/2000 Gheorghiu .......... C04B 38/0006
264/631
(Continued)

FOREIGN PATENT DOCUMENTS

JP    2008110896 A    5/2008
JP    2008119665 A    5/2008

OTHER PUBLICATIONS

International Search Report and Written Opinion of the International Searching Authority; PCT/US2016/030493; dated Oct. 4, 2016; 18 Pages; European Patent Office.
(Continued)

*Primary Examiner* — Cam N. Nguyen
(74) *Attorney, Agent, or Firm* — Joseph M. Homa

(57) ABSTRACT

A method for firing a ceramic honeycomb body including heating a green ceramic honeycomb body from a first temperature to a second temperature at a first heating rate and at a first oxygen level. Then, the green ceramic honeycomb body is heated from the second temperature to a third temperature at a second heating rate and at a second oxygen level. In this firing schedule, the second heating rate is greater than the first heating rate, and the second oxygen level is greater than the first oxygen level. Further, oxygen is introduced into the kiln to increase an oxygen level of the kiln from the first oxygen level to the second oxygen level near a peak of organic volatile release.

23 Claims, 3 Drawing Sheets

(51) Int. Cl.
  *B01D 46/00* (2006.01)
  *B01D 46/24* (2006.01)
  *B01J 35/04* (2006.01)
  *B01J 37/08* (2006.01)

(52) U.S. Cl.
  CPC ............... *B01J 35/04* (2013.01); *B01J 37/08* (2013.01); *C04B 35/638* (2013.01); *C04B 2235/6562* (2013.01); *C04B 2235/6584* (2013.01); *C04B 2235/95* (2013.01)

(56) References Cited

U.S. PATENT DOCUMENTS

| | | | | |
|---|---|---|---|---|
| 6,099,793 | A * | 8/2000 | Dull | C04B 35/195 |
| | | | | 264/631 |
| 6,287,509 | B1 | 9/2001 | Gheorghiu | |
| 6,325,963 | B1 * | 12/2001 | Dull | C04B 35/195 |
| | | | | 264/630 |
| 7,238,319 | B2 | 7/2007 | Brennan et al. | |
| 7,259,120 | B2 * | 8/2007 | Ellison | C04B 35/478 |
| | | | | 501/127 |
| 8,444,737 | B2 | 5/2013 | Iyer | |
| 8,679,385 | B2 * | 3/2014 | Chou | B28B 1/50 |
| | | | | 264/50 |
| 9,133,062 | B2 * | 9/2015 | Castilone | C04B 35/195 |
| 9,221,192 | B2 * | 12/2015 | Beall | B28B 11/243 |
| 9,446,560 | B2 * | 9/2016 | Bronfenbrenner | B29D 24/005 |
| 9,452,578 | B2 * | 9/2016 | Bronfenbrenner | B29D 24/005 |
| 9,988,311 | B2 * | 6/2018 | Merkel | C04B 35/478 |
| 10,000,424 | B2 * | 6/2018 | Beall | C04B 35/195 |
| 2002/0003322 | A1 * | 1/2002 | Dull | C04B 35/195 |
| | | | | 264/630 |
| 2007/0259769 | A1 * | 11/2007 | Ellison | C04B 35/478 |
| | | | | 501/137 |
| 2008/0011662 | A1 | 1/2008 | Milosavljevic et al. | |
| 2009/0298670 | A1 * | 12/2009 | Murtagh | C04B 35/195 |
| | | | | 501/80 |
| 2011/0195838 | A1 | 8/2011 | Brady et al. | |
| 2014/0138882 | A1 | 5/2014 | Castilone et al. | |
| 2015/0028528 | A1 | 1/2015 | Bronfenbrenner et al. | |
| 2016/0368825 | A1 * | 12/2016 | Bronfenbrenner | B29D 24/005 |

OTHER PUBLICATIONS

JP2017558009 Office Action dated Feb. 27, 2019, Japan Patent Office.

* cited by examiner

METHOD OF FIRING A CERAMIC HONEYCOMB BODY

CROSS-REFERENCE TO RELATED APPLICATIONS

This application is a national stage application under 35 U.S.C. § 371 of International Patent Application Serial No. PCT/US2016/030493 filed on May 3, 2016, which claims the benefit of priority of U.S. Provisional Application Ser. No. 62/158,245 filed on May 7, 2015 the contents of both are relied upon and incorporated herein by reference in their entireties.

BACKGROUND

Field

The present specification generally relates to methods of firing ceramic honeycomb bodies, more specifically, to methods of firing ceramic honeycomb bodies with minimal cracking.

Technical Background

Ceramic filters, particularly large frontal area filters, include organic raw materials that should be removed in the firing process. Such organic materials may be contained in, for example, binders (Methocel, polyvinyl alcohol, etc.), lubricants, dispersant, pore formers (starch, graphite, and other polymers). These materials may be burned out in the presence of oxygen at temperatures above their flash points. Some of these materials are also removed as volatile organic compounds (VOC) that are burned in a kiln and/or in an after treatment apparatus, such as a thermal oxidizer. The decomposition and/or oxidation of these materials usually release heat and often influence shrinkage or growth of the material, which may cause stresses and ultimately lead to cracking.

Conventional firing processes for large or heavy duty ceramic bodies rely on firing cycles with slow heating rates, such as 12° C./hr to 24° C./hr, when heating to a temperature below 600° C. These low heating rates allow the organic raw materials to be removed gradually and completely, thereby reducing the stress in the ceramic material. However, firing cycles are prolonged by using these low heating rates, as it may take up to 50 hours to heat the green ceramic body to 600° C., and, as a result, the entire firing cycle may take from 60 hours to 100 hours.

Accordingly, a need exists for a firing cycle with increased heating rates, particularly heating rates up to 600° C. that does not cause cracking in the ceramic body.

SUMMARY

Disclosed herein are methods for firing a precursor body into a ceramic body which minimize or prevent the occurrence of cracks in the fired ceramic body. The precursor body, or "green body", may comprise ceramic-forming components and/or ceramic components, which when fully fired, result in a ceramic body, for example a ceramic body comprising cordierite, aluminum titanate, mullite, alumina, cordierite-mullite-aluminum titanate, beta-spodumene, silicon carbide and combinations thereof. The precursor body can be fired in a kiln (or furnace). According to one embodiment, a method for firing a green body to a cordierite ceramic body the body is disclosed. The method comprises heating the green ceramic honeycomb body from a first temperature to a second temperature at a first heating rate and at a first oxygen level. Then, the green ceramic honeycomb body is heated from the second temperature to a third temperature at a second heating rate and at a second oxygen level. In this firing schedule, the second heating rate is greater than the first heating rate, and the second oxygen level is greater than the first oxygen level. Further, oxygen is introduced into the kiln to increase an oxygen level of the kiln from the first oxygen level to the second oxygen level near a peak of organic volatile release.

In another embodiment, a method may comprise heating the green ceramic honeycomb body from a first temperature of about 180° C. to about 220° C. to a second temperature of about 430° C. to about 470° C. at a first heating rate of from about 20° C./hr to about 45° C./hr and at a first oxygen level of from about 5% by volume to about 13% by volume. Then, the green ceramic honeycomb body is heated from the second temperature to a third temperature of about 580° C. to about 620° C. at a second heating rate of from about 35° C./hr to about 90° C./hr and at a second oxygen level from about 12% by volume to about 20% by volume. In this firing schedule, the second heating rate is greater than the first heating rate, and the second oxygen level is greater than the first oxygen level. Further, oxygen is introduced into the kiln to increase an oxygen level of the kiln from the first oxygen level to the second oxygen level near a peak of organic volatile release, and the green ceramic honeycomb body has a diameter from about 8 inches to about 15 inches, and an aspect ratio from about 0.4 to about 1.5.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
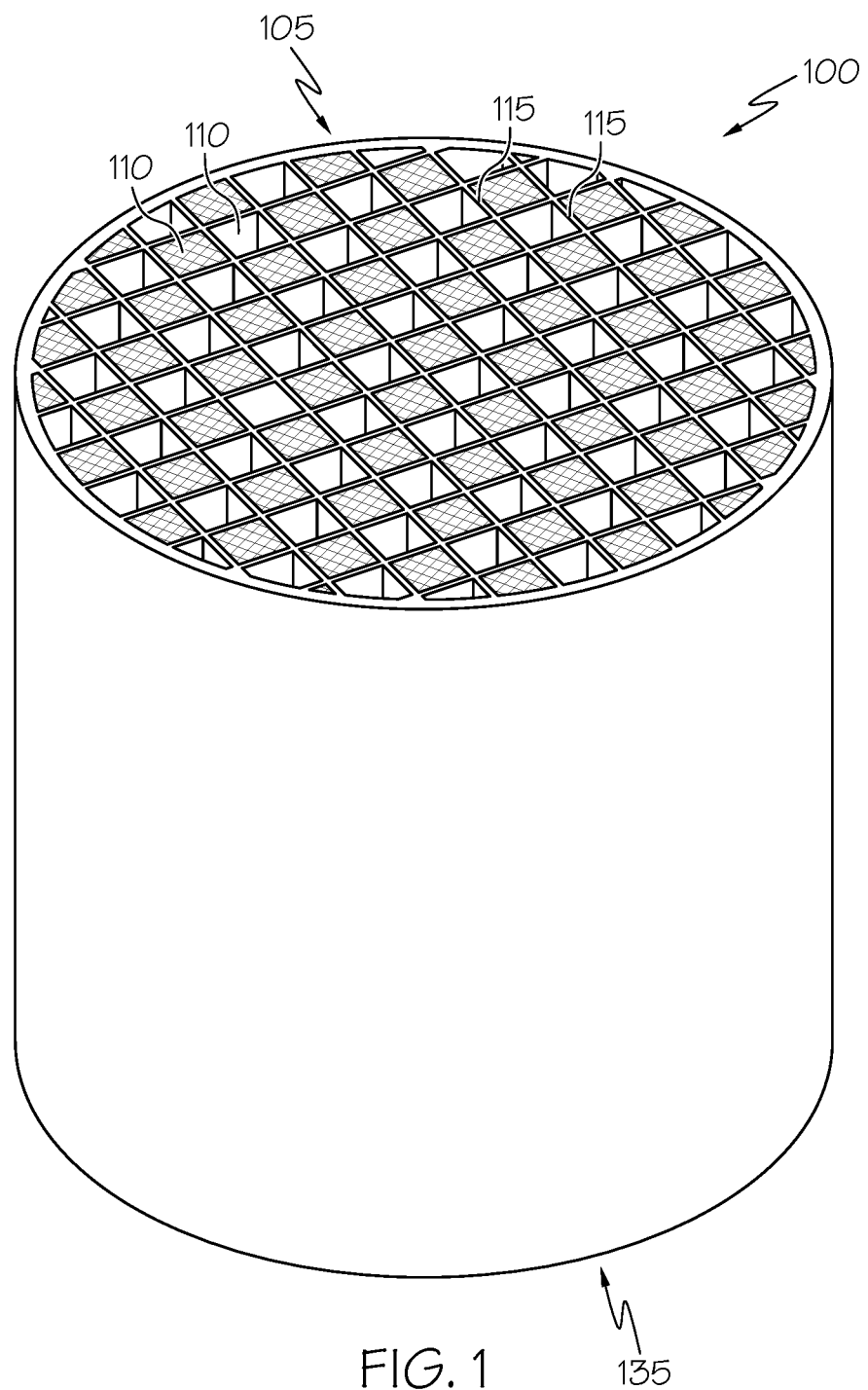
FIG. 1 is a schematic of a ceramic honeycomb body made according to embodiments disclosed and described herein, in which a precursor body has been fully fired and which includes inserted plugs.

Reference will now be made in detail to embodiments of methods for firing ceramic bodies, embodiments of which are illustrated in the accompanying drawings. Whenever possible, the same reference numerals will be used throughout the drawings to refer to the same or like parts. In one embodiment, a method for firing a green body to a cordierite ceramic body without cracking the body is disclosed. In this embodiment, the method may comprise heating the green ceramic honeycomb body from a first temperature to a second temperature at a first heating rate and at a first oxygen level. Then, the green ceramic honeycomb body is heated from a second temperature to a third temperature at a second heating rate and at a second oxygen level. In this firing schedule, the second heating rate is greater than the first heating rate, and the second oxygen level is greater than the first oxygen level. Further, oxygen is introduced into the kiln to increase an oxygen level of the kiln from the first oxygen level to the second oxygen level near a peak of organic volatile release. Various methods of firing ceramic bodies will be described herein with specific reference to the appended drawings.

As used herein, a precursor body may be referred to as a "green body", "green ceramic body", or "green ceramic honeycomb body", and may comprise unsintered material or component, unless otherwise specified. The precursor body may comprise ceramic-forming components and/or ceramic components, which when fully fired, result in a ceramic body, for example a ceramic body comprising cordierite, aluminum titanate, mullite, alumina, cordierite-mullite-aluminum titanate, beta-spodumene, silicon carbide and combinations thereof. The precursor body can be fired in a kiln (or furnace).

In the following description, it should be understood that when the ceramic body is described as being heated to a given temperature, the entire body is heated to achieve the referenced temperature.

As used herein, a "wt %," "weight percent," or "percent by weight" of an inorganic, unless specifically stated to the contrary, is based on the total weight of the total inorganics in which the component is included. Organic components are specified herein as superadditions based upon 100% of the inorganic components used.

Embodiments of the present disclosure provide improved methods for firing ceramic bodies. In some embodiments, the precursor bodies may comprise cordierite-forming raw materials and organic materials having an overall composition effective to yield cordierite ceramic upon firing. The cordierite ceramic body may be used as a diesel particulate filter and/or as a substrate support for catalytic materials.

Depicted in FIG. 1 is a ceramic body (100) according to one or more embodiments shown and described herein. For example, ceramic body (100) may have a honeycomb structure (105) comprising a plurality of parallel channels (110) defined by intersecting channel walls (115). The plurality of parallel channels (110) and intersecting channel walls (115) extend between an inlet end (130) and an outlet end (135). One or more of the channels (110) may be plugged (as shown in FIG. 1), such as by plugging before final firing or by plugging a fully fired ceramic body, such as with subsequent heating to cure plugs.

In some embodiments, the ceramic body (100) is formed from cordierite-forming raw materials. The cordierite-forming raw materials may include at least one magnesium source, at least one alumina source, at least one silica source, and optionally one or more kaolin clays, but the precursor body may be clay-free. In some embodiments, the cordierite-forming raw materials have an overall composition comprising, in weight percent on an oxide basis, 5-25 wt % MgO, 40-60 wt % $SiO_2$, and 25-45 wt % $Al_2O_3$. In other embodiments, the cordierite-forming raw materials comprise an overall composition comprising, in weight percent on an oxide basis, 11-17 wt % MgO, 48-54 wt % $SiO_2$, and 32-38 wt % $Al_2O_3$. In some embodiments, the at least one alumina source and at least one silica source are not kaolin clays. In other embodiments, kaolin clays, raw and calcined, may comprise less than 30 wt %, or less than 20 wt %, of the cordierite-forming raw materials. The green body may also include impurities, such as, for example, CaO, $K_2O$, $Na_2O$, and $Fe_2O_3$.

In some embodiments, sources of magnesium include, but are not limited to, magnesium oxide or other materials having low water solubility that, when fired, convert to MgO, such as $Mg(OH)_2$, $MgCO_3$, and combinations thereof. For example, the source of magnesium may be talc $(Mg_3Si_4O_{10}(OH)_2)$, including calcined and/or uncalcined talc, and coarse and/or fine talc.

In various embodiments, the at least one magnesium source may be present in an amount from about 5 wt % to about 25 wt % of the overall cordierite-forming raw materials on an oxide basis. In other embodiments, the at least one magnesium source may be present in an amount from about 10 wt % to about 20 wt % of the cordierite-forming raw materials on an oxide basis. In further embodiments, the at least one magnesium source may be present in an amount from about 11 wt % to about 17 wt %.

In some embodiments, a median particle diameter of the at least one magnesium source may be greater than or equal to about 5 μm, greater than or equal to about 10 μm, or even greater than or equal to about 20 μm. In other embodiments, the at least one magnesium source may have a median particle diameter ranging from about 1 μm to about 40 μm or even from about 10 μm to about 40 μm. In other embodiments, the median particle diameter of the at least one magnesium source may be from about 15 μm to about 30 μm.

In embodiments, sources of alumina include powders that, when heated to a sufficiently high temperature in the absence of other raw materials, preferably yield substantially pure aluminum oxide. Examples of alumina sources used in embodiments include alpha-alumina, a transition alumina such as gamma-alumina or rho-alumina, hydrated alumina or aluminum trihydrate, gibbsite, corundum ($Al_2O_3$), boehmite (AlO(OH)), pseudoboehmite, aluminum hydroxide (Al(OH)$_3$), aluminum oxyhydroxide, and mixtures thereof. In some embodiments, the at least one alumina source is a kaolin clay. In other embodiments, the at least one alumina source is not a kaolin clay.

In embodiments, the at least one alumina source may be present in an amount from about 25 wt % to about 45 wt % of the overall cordierite-forming raw materials on an oxide basis. In some embodiments, the at least one alumina source may be present in an amount from about 30 wt % to about 40 wt % of the cordierite-forming raw materials on an oxide basis. In further embodiments, the at least one alumina source may be present in an amount from about 32 wt % to about 38 wt % of the cordierite-forming raw materials on an oxide basis. The at least one alumina source may have a median particle diameter of greater than or equal to about 1 μm, according to some embodiments. In some embodiments, the at least one alumina source has a median particle diameter ranging from about 1 μm to about 20 μm.

In embodiments, sources of silica may include: non-crystalline silica, such as fused silica or sol-gel silica; silicone resin, low-alumina substantially alkali-free zeolite; diatomaceous silica; kaolin; and crystalline silica, such as quartz or cristobalite. Additionally, in some embodiments, the sources of silica may include silica-forming sources that comprise a compound that forms free silica when heated. For example, silicic acid or a silicon organometallic compound may form free silica when heated. In some embodiments, the at least one silica source is not a kaolin clay.

In embodiments, the at least one silica source may be present in an amount from about 40 wt % to about 60 wt % of the overall cordierite-forming raw materials on an oxide basis. In some embodiments, the at least one silica source may be present in an amount from about 45 wt % to about 55 wt % of the cordierite-forming raw materials on an oxide basis. In a further embodiments, the at least one silica source may be present in an amount from about 48 wt % to about 54 wt %. In embodiments, the at least one silica source has a median particle diameter greater than or equal to about 3 In some embodiments, the at least one silica source has a median particle diameter greater than or equal to about 5 In further embodiments, the at least one silica source has a median particle diameter greater than or equal to about 10 In even further embodiments, the at least one silica source has a median particle diameter greater than or equal to about 20 In some embodiments, the at least one silica source has a median particle diameter ranging from about 5 μm to about 40 μm. In other embodiments, the at least one silica source has a median particle diameter ranging from about 10 μm to about 30 In further embodiments, the at least one silica source has a median particle diameter ranging from about 15 μm to about 25 μm.

In embodiments that include kaolin clay, sources of kaolin clay may be selected from laminated and delaminated kaolins. In some embodiments, the cordierite-forming raw materials may further comprise calcined kaolin clay, laminated or delaminated. For example, the cordierite-forming raw materials may comprise a blend of at least one raw kaolin clay and at least one calcined kaolin clay. In some embodiments, the at least one kaolin clay comprises a blended hydrous kaolin clay product comprising a coarse kaolin clay component and a fine kaolin clay component. In some embodiments, the coarse kaolin clay component has a mean particle size of less than or equal to about 2 μm in diameter and is a cretaceous clay, and the fine kaolin clay component has a mean particle size less than or equal to about 1 μm in diameter and is a tertiary clay. In some embodiments, the clay product comprises from about 35 wt % to about 100 wt % of the fine kaolin clay component and from about 65 wt % to about 0 wt % of the coarse kaolin clay component.

In embodiments comprising kaolin clay, the total amount of kaolin clay, including raw and calcined kaolin clays, may be less than or equal to about 30 wt % of the cordierite-forming raw materials. In some embodiments, the total amount of kaolin clay may be less than or equal to about 20 wt % of the cordierite-forming raw materials. In further embodiments, the total amount of kaolin clay may be less than or equal to about 15 wt % of the cordierite-forming raw materials.

In embodiments, the organic material may comprise pore-forming materials, binders, surfactants, and lubricants. Pore-forming materials may include a starch (e.g., corn, barley, bean, potato, rice, tapioca, pea, sago palm, wheat, canna, and walnut shell flour), polymers (e.g., polybutylene, polymethylpentene, polyethylene (preferably beads, rods, or multi-lobed beads), polypropylene (preferably beads), polystyrene, polyamides (nylons), epoxies, ABS, Acrylics, and polyesters (PET)), hydrogen peroxides, or a phenol resin, or mixtures thereof. In some embodiments, the pore-forming material is a starch comprising corn, barley, bean, potato, rice, tapioca, pea, sago palm, wheat, canna, walnut shell flour, or mixtures thereof.

In embodiments, the organic material may comprise at least one pore-forming material. In other embodiments, the organic material may comprise at least two pore-forming materials. In further embodiments, the organic material may comprise at least three pore-forming materials. For example, a combination of a polymer and a starch may be used. In another embodiment, a combination of two or more starches may be used. In a further embodiment, a combination of two or more polymers may be used.

The pore forming agent may be present in any amount effective to provide a desired amount of porosity in the cordierite body. In embodiments, the pore forming agent may be present at from about 0.5 wt % to about 12 wt %. In another embodiment, the pore forming agent may be present at from about 7 wt % to about 10 wt %.

In embodiments, binders may include cellulose-containing components. Exemplary cellulose-containing components include, for example, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxymethylcellulose, carboxyl methylcellulose, and combinations thereof.

Surfactants and lubricants may be added to form the green body as long as they do not cause decomposition of the pore forming agent while forming the green body. In embodiments, surfactants include $C_8$ to $C_{22}$ fatty acids and/or their derivatives. Additional surfactant components that may be used with these fatty acids are $C_8$ to $C_{22}$ fatty esters, $C_8$ to $C_{22}$ fatty alcohols, salt of fatty acids (such as sodium salt of stearic acid), and combinations thereof. Exemplary surfactants are stearic acid, lauric acid, oleic acid, linoleic acid, palmitoleic acids, sodium stearate, and their ester or alcohol derivatives. In some embodiments, the surfactant may be lauric acid, stearic acid, oleic acid, their ester or alcohol derivatives, and combinations thereof. The amount of surfactants may range from about 0.5 wt % to about 2 wt %.

In embodiments lubricants may include light mineral oil, corn oil, high molecular weight polybutenes, polyol esters, a blend of light mineral oil and wax emulsion, a blend of paraffin wax in corn oil, and combinations thereof. The amount of lubricant may range from about 0.2 wt % to about 10 wt %. In some embodiments, the amount of lubricant is in a range from about 0.7 wt % to about 2 wt %.

Solvents may be added to form the green body, and may include aqueous-based solvents, such as water or water-miscible solvents. In some embodiments, the solvent is water. The amount of aqueous solvent present may range from about 20 wt % to about 50 wt %.

The raw materials and organic materials may be mixed to form a batch. By way of example, the cordierite-forming raw materials may be combined as powdered materials and intimately mixed to form a substantially homogeneous batch. The organic materials and/or solvent may be mixed with the cordierite-forming raw materials individually, in any order, or together to form a substantially homogeneous batch. Of course, other suitable steps and conditions for combining and/or mixing cordierite-forming raw materials and organic materials together to produce a substantially homogeneous batch may be used. For example, the cordierite-forming raw materials and organic materials may be mixed by a kneading process to form a substantially homogeneous batch.

The batch may be shaped into a green body by conventional forming processes. For example, the batch may be formed by extrusion, injection molding, slip casting, centrifugal casting, pressure casting, dry pressing, or similar forming processes.

In the embodiments described herein, the batch composition is formed or otherwise shaped, such as into a honeycomb structure or configuration. For example, a green honeycomb body may be a cylinder having end surfaces with a shape of a circle or an ellipse, a prism having the end surfaces with a shape of a polygon, such as a triangle or a square, a shape in which the sides of the cylinder and prism are bent like a "doglegged shape." The shape of the through holes in the body is not particularly limited. For example, the sectional shape may be a polygon, such as a square, a hexagon, an octagon, a circle, an ellipse, a triangle, or other shapes or combinations. It should however be understood that the particular desired size and shape of the ceramic article can depend on the application, e.g., in automotive applications by engine size and space available for mounting, etc. include trough and radial flow filters In some embodiments, the green body may be formed into a ceramic body having a diameter ranging from about 8 inches to about 15 inches. In some embodiments, the green body may be formed into a ceramic body having a diameter ranging from about 9.5 inches to about 14.5 inches. In other embodiments, the green body may be formed into a ceramic body having a diameter ranging from about 11 inches to about 14 in. In some embodiments, the green body may have an aspect ratio of from about 0.4 to about 1.5, such as from about 0.6 to about 1.25. In some embodiments, the green body may have an aspect ratio from about 0.8 to about 1.0. As used herein "aspect ratio" is a ratio defined by the diameter of the ceramic body and the height of the ceramic body.

Following shaping, the green body may optionally be dried, such as by known methods, to remove excess liquid, such as, for example, water. The dried green body may then be introduced into a furnace or kiln, where the green body is exposed to at least two different heating stages. Although only two heating cycles are described in the embodiments below, other heating stages may be used in addition to the two heating stages described below. For example, the two heating stages may be preceded by a pre-heating cycle that heats the green body from room temperature to within a first temperature range, which is described below, or the two heating stages may be followed by an annealing stage where the green body is held within an annealing temperature range for an annealing time period to allow the green body to anneal. In some embodiments described herein, the green body can be fired at a reduced time schedule to form a ceramic body or a sintered ceramic body, as will be described in further detail herein.

Figure 2:
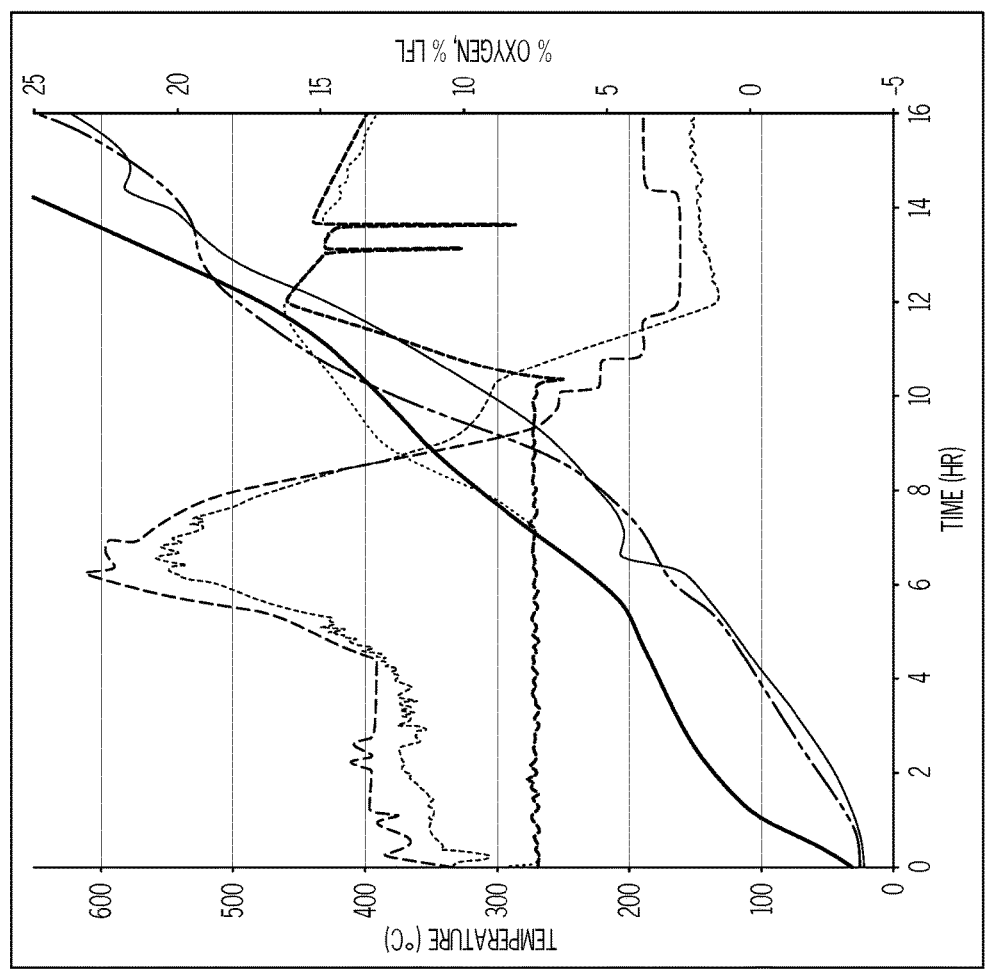
FIG. 2 is a graph of a firing schedule according to embodiments disclosed and described herein and of a conventional firing schedule.

Referring now to FIG. 2, one exemplary firing schedule for firing a green honeycomb body into a ceramic body is schematically depicted, and one comparative firing schedule is also depicted. Firing the green honeycomb body according to the exemplary firing schedule generally comprises heating the green honeycomb body from a first temperature to a second temperature. Heating the green honeycomb body from the first temperature to the second temperature is conducted at a first heating rate and begins at a first oxygen level. Firing the green honeycomb body also generally comprises heating the green honeycomb body from the second temperature to a third temperature. Heating the green honeycomb body from the second temperature to the third temperature is conducted at a second heating rate and begins at a second oxygen level. In embodiments, the second heating rate is greater than the first heating rate, and the second oxygen level is greater than the first oxygen level. Further, according to embodiments, oxygen is introduced into the kiln near a peak of organic volatile release from the green honeycomb body to increase an oxygen level of the kiln from the first oxygen level to the second oxygen level, which is discussed in more detail below.

As noted above, FIG. 2 shows two different firing schedules: the first firing schedule is a firing schedule according to embodiments disclosed and described herein, where the oxygen level in the kiln is increased near the peak of organic volatile release; and the second firing schedule is a comparative firing schedule where the oxygen level in the kiln is increased well after the peak of organic volatile release. In FIG. 2, the kiln set point temperature is represented by a bold solid line; the core temperature of a body fired according to embodiments disclosed and described herein is represented by two dashes separated by an elongated line; the oxygen level of the kiln in a firing schedule according to embodiments disclosed and described herein is represented by a lightly dotted line; the lower flammability limit of a firing schedule according to embodiments disclosed and described herein is represented by a dashed line; the core temperature of a ceramic body fired by a comparative firing schedule is represented by light solid line; the oxygen level of the kiln in a comparative firing schedule is represented by a bold dashed line; and the lower flammability limit of a comparative firing schedule is represented by a short-dashed line.

In embodiments, the green ceramic honeycomb body comprises cordierite-forming raw materials and organic material. Accordingly, in some embodiments, the green ceramic honeycomb body may be pre-heated to the first temperature, which is a temperature that is less than a thermal decomposition temperature of the organic material (e.g., the binder and pore-former) present in the green body. The thermal decomposition temperature of the organic material is the temperature at which an organic material degrades under applied heat. Where more than one organic material is present in the green body, the thermal decomposition temperature of the organic material may be the lowest thermal decomposition temperature of all organic materials present in the green body. Accordingly, in embodiments, the first temperature may be from about 180° C. to about 220° C., such as from about 190° C. to about 210° C. In other embodiments, the first temperature may be from about 195° C. to about 205° C., such as about 200° C.

As shown in FIG. 2, the green ceramic honeycomb body is gradually pre-heated at a low heating rate to the first temperature of about 200° C. where the heating rate is then increased. The oxygen level of the kiln in this pre-heating stage is kept relatively low and, in embodiments, the oxygen level in the kiln during the pre-heating stage may be the same as the first oxygen level in the kiln when the green ceramic honeycomb body is heated from the first temperature to the second temperature.

After reaching the first temperature, the green body is heated from the first temperature to the second temperature at a first heating rate. In some embodiments, the first heating rate may be from about 20° C./hr to about 45° C./hr, such as from about 25° C./hr to about 45° C./hr. In other embodiments, the first heating rate may be from about 30° C./hr to about 42° C./hr. In embodiments, the second temperature may be from about 430° C. to about 470° C., such as from about 440° C. to about 460° C. In other embodiments, the second temperature may be from about 445° C. to about 455° C., such as about 450° C. With reference to the embodiment shown in FIG. 2, the second temperature is about 450° C. and the first heating rate is about 45° C./hr.

The oxygen level in the kiln at the first temperature (hereinafter referred to as the "first oxygen level") is kept relatively low when compared to conventional firing cycles and ambient conditions. In embodiments, the oxygen level in the kiln is maintained at the first oxygen level into the firing schedule where the kiln is heated from the first temperature to the second temperature until near the peak of organic volatile release. In embodiments, the first oxygen level in the kiln may be from about 5% to about 13% by volume, such as from about 8% to about 11% by volume. In other embodiments, the first oxygen level in the kiln may be from about 9% to about 10% by volume. As shown in FIG. 2, the first oxygen level in the kiln may be the same as the amount of oxygen in the kiln during a subsequent pre-heating stage. However, in other embodiments, the first oxygen level in the kiln may be different than an amount of oxygen in a preceding pre-heating stage. Without being bound by any particular theory, it is believed that when the first heating rate and/or oxygen level are too high, the high temperatures and/or the excess oxygen promotes the fast burning of organic materials in ceramic body, which involves large amounts of heat that may lead to cracking. However, heating rates and/or oxygen levels that are too low can lengthen the cycle time, and may not burn off a sufficient amount of char prior to later process steps.

After the first temperature is reached, the green body is heated at the first heating rate to the second temperature. During this heating, the kiln reaches a temperature sufficient to burn organic material from the green body. Burning of organic materials can include both organic material and partially decomposed organic material (i.e., char). The temperature sufficient to burn off the organic material varies depending on the size and shape of the ceramic body that is being treated. However, generally the temperature sufficient to burn organic material is greater than the first temperature and less than the second temperature.

The burning of organic materials is generally a highly exothermic reaction. The low oxygen levels and low temperatures (achieved by low heating rates) are thought to suppress the likelihood of thermal runaway conditions during the burning of the organic materials. Therefore, in conventional methods oxygen levels are kept low until well after the burning of organic materials is complete. In these conventional methods, oxygen levels are then increased well after the organic materials have burnt off to increase combustion and remove any remaining char. However, by keeping the oxygen levels low until well after the organic materials are burnt off, conventional methods have long run times. Accordingly, to reduce run times of the firing schedule, embodiments disclosed herein increase the level of oxygen in the kiln near a peak of organic volatile release. In some embodiments, the temperature where oxygen is introduced into the kiln is from about 260° C. to about 300° C., such as from about 270° C. to about 290° C., or even about 280° C.

As used herein, "near a peak of organic volatile release" refers to a point near a peak of organic volatile release (such as a graphical peak of LFL vs. time) within measurement and equipment tolerances. For example, with reference to FIG. 2, volatile organic release is monitored by measuring the lower flammable limit (LFL) of the kiln using conventional measurement techniques. As shown in FIG. 2, the LFL of the kiln has a demonstrable and measurable peak that indicates a maximum amount of volatile organic release from the green body. During the firing schedule, the LFL of the kiln has reached its peak when the LFL decreases enough to confirm that the peak was reached. When it is determined that the peak LFL was reached, oxygen is introduced into the kiln to increase the oxygen levels and facilitate combustion of the remaining organic material. In other embodiments, the LFL may be measured on a sample ceramic body having the same geometry and composition as honeycomb ceramic bodies that are to be produced. This sample cycle will create an exemplary LFL graph that can be used for future analysis. For example, once the heating cycle of the sample ceramic body is complete, it may be determined when the peak of the LFL occurs (i.e., at what temperature and/or at what period of time during the process) on the exemplary LFL graph. Subsequently, the exemplary LFL graph may be used to fire honeycomb ceramic bodies by introducing oxygen at the time coinciding with a time after the peak LFL on the exemplary LFL graph.

In some embodiments, "near a peak of the organic volatile release" may be measured in a percentage of the total height of the peak of the organic volatile release. For example, oxygen may be introduced into the kiln at a point where the organic volatile release has reached its peak and returned to a point that is from about 80% to about 50% of the peak, such as from about 75% to about 55% of the peak, or even from about 70% to about 60% of the peak. As an example, where LFL is measured as a volume percentage of the gaseous atmosphere in the kiln, if the LFL reaches its peak at about 25% LFL, oxygen may be introduced at a point where the organic volatile release returns to a point of from about 20% to about 12.5% LFL, such as to a point of from about 18.75% to about 13.75% LFL, or even a point of from about 17.5% to about 15% LFL.

Using FIG. 2 as an example, the LFL of the kiln reaches its peak about 6 hours into the firing schedule. The peak was confirmed at about 7 hours into the firing schedule and oxygen was introduced into the kiln. In contrast, the conventional firing schedule shown in FIG. 2 introduces oxygen into the kiln at about 10 hours into the firing schedule and well after the peak of organic volatile release. Accordingly, in embodiments, near the peak of organic volatile release is less than or equal to about 2 hours after the peak of organic volatile release, such as less than or equal to about 1.5 hours after the peak of organic volatile release. In other embodiments, near the peak of organic volatile release is less than or equal to about 1 hour after the peak of organic volatile release, such as less than or equal to about 0.5 hours after the peak of organic volatile release. In embodiments, oxygen is introduced into the kiln after the peak of organic volatile release, and low oxygen levels are maintained through the peak of organic volatile release.

Although organic volatile release is measured using LFL in the embodiment depicted in FIG. 2, it should be understood that other methods may alternatively be used to measure organic volatile release. For example, in embodiments, volatile organic release may be measured by flame ionization detection, Fourier Transform Infrared (FTIR) spectroscopy, or mass spectrometry.

Oxygen is introduced into the kiln near the peak of the organic volatile release and can be continually introduced into the kiln until the kiln reaches the second temperature. Once the kiln reaches the second temperature in the firing schedule, oxygen control is no longer necessary and oxygen is no longer intentionally introduced into the kiln. Accordingly, and the oxygen level gradually decreases as combustion continues. In some embodiments, the oxygen level at the second temperature is from about 12% by volume to about 20% by volume, such as from 13% by volume to 17% by volume. In other embodiments, the oxygen level at the second temperature is from about 14% by volume to about 16% by volume, such as about 15% by volume; FIG. 2 shows about 16%.

After the green body is heated to the second temperature, the green body may then be heated from the second temperature to a third temperature in an atmosphere suitable for burning organic materials, including char, from the green body. Char can increase the stiffness (elastic modulus) of the green body. The increased stiffness, particularly if there is a stiffness differential from a center of the green body to a surface of the green body, can substantially increase and/or amplify stresses present in the green body, which can lead to cracking. Accordingly, it is believed that heating rates and oxygen levels when heating the green body from the second temperature to the third temperature can be controlled to avoid excessive temperature differentials due to burning of organic materials and dehydration of clay or stiffness and/or shrinkage differentials due to unburnt char. Thus, in embodiments, the green body has substantially all char removed by burning (i.e., a sufficiently low organic material content). Accordingly, in embodiments, the third temperature is a temperature at which the majority of organic material is burnt off of the green body. In some embodiments, the third temperature is from about 580° C. to about 620° C., such as from about 590° C. to about 610° C. In other embodiments, the third temperature is from about 595° C. to about 605° C., such as about 600° C. By introducing oxygen into the kiln near the peak organic volatile release, char burnout may be complete at lower temperatures, thus the third temperature may be lower in firing schedules according to embodiments disclosed and described herein than in conventional firing schedules. For example, with reference to FIG. 2, char burnout is complete at just above 500° C. in the firing schedule according to embodiments disclosed and discussed herein where oxygen is introduced into the kiln near the peak of organic volatile release. In contrast, char burnout is not complete until nearly 600° C. in the conventional firing schedule indicated by the localized peak (slight jump down) or plateau in core temperature even as the kiln set point is increasing due to the positive heating rate.

The green body is heated from the second temperature to the third temperature at a second heating rate. In embodiments, the second heating rate may be from about 35° C./hr to about 90° C./hr, such as from about 40° C./hr to about 70° C./hr. In other embodiments, the second heating rate may be from about 50° C./hr to about 60° C./hr. As disclosed above, oxygen is introduced into the kiln during the stage where the kiln is heated from the first temperature to the second temperature, and the oxygen level in the kiln reaches a maximum near the second temperature. Therefore, during the stage of the firing schedule where the kiln is heated from the second temperature to the third temperature, the firing atmosphere in the kiln contains more oxygen than the oxygen present at the first temperature. Therefore, in some embodiments, the stage of the firing schedule where the kiln is heated from the second temperature to the third temperature can, on average, comprise more oxygen and a higher heating rate than the stage of the firing schedule where the kiln is heated from the first temperature to the second temperature. In some embodiments, an overlap in heating rates can occur.

In some embodiments, the total amount of time to heat the green body from room temperature to the third temperature may be from about 45 hours to about 60 hours, such as from about 45 hours to about 55 hours. In some embodiments, the total amount of time to heat the green body from room temperature to the third temperature may be about 50 hours. The amount of time to heat a green body to a temperature similar to the third temperature disclosed above using conventional firing schedules can be in excess of 70 hours.

Referring again to FIG. 2, the firing schedule according to embodiments disclosed and discussed herein limits crack generation by using a low oxygen level and a low heating rate in the firing schedule until near the peak of organic volatile release. Once the peak of organic volatile release is reached, the oxygen level is increased and, subsequent to reaching a maximum oxygen level, the heating rate is increased to remove char. Such a firing schedule, as shown in FIG. 2, is performed on three ceramic honeycomb bodies measuring 13.5 inches, 11.5 inches, and 14.3 inches in diameter and all measuring 6 inches in height. For each of these ceramic honeycomb bodies no cracks were generated in the ceramic body. In contrast, three ceramic honeycomb bodies were fired using a conventional firing schedule and cracks were observed as disclosed in Table 1 below:

TABLE 1

| Ceramic Body Size | Crack Rate |
| --- | --- |
| 13.5" × 6" | 13% |
| 11.5" × 6" | 21% |
| 14.3 × 6" | 9% |

As shown in Table 1, ceramic honeycomb bodies fired according to a conventional firing schedule where oxygen is introduced well after the peak of organic volatile release result in increased crack rates when compared to ceramic honeycomb articles produced using a firing schedule according to embodiments disclosed and discussed herein.

Figure 3:
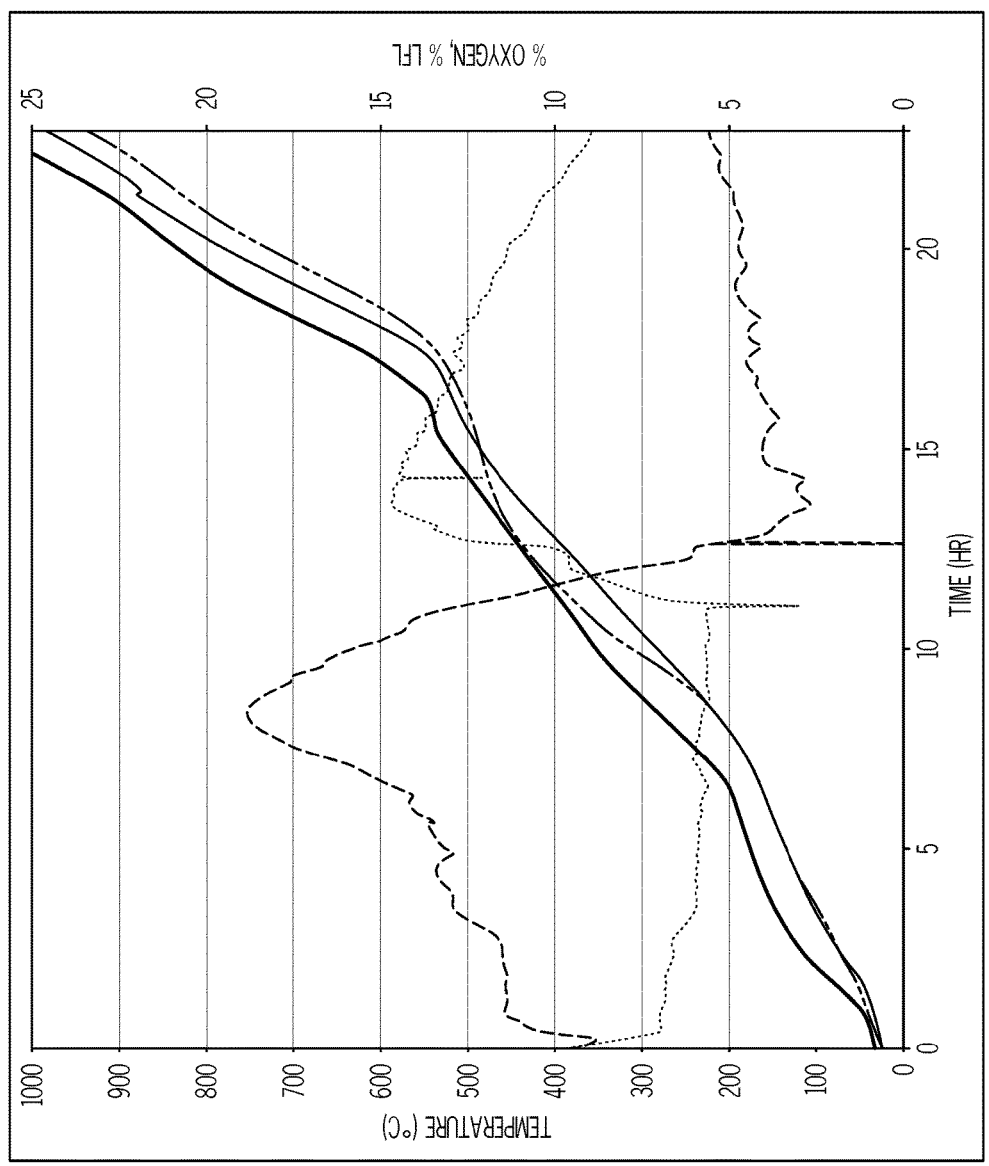
FIG. 3 is a graph of a firing schedule using a ring-shaped setter and a firing schedule using a disc-shaped setter.

In addition to varying oxygen levels and heating rates, as disclosed in embodiments above, the mechanism for holding a ceramic honeycomb body in the kiln may also be considered. For example, in embodiments, a ring-shaped setter is used so that there is minimal contact between the setter and the ceramic honeycomb body, thus a large portion of the ceramic honeycomb body is exposed to the kiln atmosphere. This increased exposure to oxygen allows for more efficient decomposition of organic volatile materials by increasing the amount of oxygen the ceramic honeycomb body is exposed to during firing. In addition, when compared to other setter geometries, such as a disc-shaped setter, the ring-shaped setter has less direct contact with the ceramic honeycomb body, thus there is less likelihood that hot points will be formed where the setter contacts the ceramic honeycomb body. FIG. 3 shows a comparison between a ring-shaped setter and a disc-shaped setter. In FIG. 3 the kiln temperature is represented by a bold solid line; the temperature at the bottom of a green ceramic honeycomb body where a ring-shaped setter is used is represented by a line with two dashes separated by an elongated line; the temperature at the bottom of a green ceramic honeycomb body where a disc-shaped setter is used is represented by a solid line; the oxygen level in the kiln is represented by a dotted line, and the LFL level in the kiln is represented by a dashed line. As shown in FIG. 3, the green ceramic honeycomb body where a ring-shaped setter is used has an exothermic jump just above 400° C., which indicates that the char is carried by the green ceramic honeycomb body to a temperature just above 400° C. and after about 12 hours of the firing schedule. However, the green ceramic honeycomb body where a disc-shaped setter is used indicates an exothermic jump just below 900° C., which indicates that the char is carried by the green ceramic honeycomb body to a temperature of nearly 900° C. and after about 20 hours of the firing schedule. As disclosed above, carrying char in the green ceramic honeycomb body can increase the stiffness of the ceramic body and can lead to cracking. Therefore, reducing the amount of time that the green ceramic honeycomb article carries the char will reduce the likelihood that the ceramic body will crack.

Table 2 below shows the effect that setter geometry has on the crack rate. As shown in Table 2, green ceramic bodies with three different geometries are formed and fired according to the schedules shown in FIG. 3 for a ring-shaped setter and for a disc-shaped setter (six green ceramic bodies are tested in total). The green ceramic bodies fired using a ring-shaped setter did not crack at a noticeable rate, but the green ceramic bodies fired using a disc-shaped setter all had significant cracking, as shown in Table 2 below.

TABLE 2

| Size | Setter Type | Crack Rate |
|---|---|---|
| 13.5" × 6" | Ring-Shaped | 0% |
| 11.5" × 6" | Ring-Shaped | 0% |
| 14.3" × 6" | Ring-Shaped | 0% |
| 13.5" × 6" | Disc-Shaped | 100% |
| 11.5" × 6" | Disc-Shaped | 100% |
| 14.3" × 6" | Disc-Shaped | 100% |

Based on the foregoing, it should be understood that various methods for firing a green body to a cordierite ceramic body without cracking the body is disclosed. In a first exemplary embodiment, the method may comprise heating the green ceramic honeycomb body from a first temperature to a second temperature at a first heating rate and at a first oxygen level. Then, the green ceramic honeycomb body is heated from a second temperature to a third temperature at a second heating rate and at a second oxygen level. In this firing schedule, the second heating rate is greater than the first heating rate, and the second oxygen level is greater than the first oxygen level. Further, oxygen is introduced into the kiln to increase an oxygen level of the kiln from the first oxygen level to the second oxygen level near a peak of organic volatile release.

In a second exemplary embodiment, the method may comprise heating the green ceramic honeycomb body from a first temperature of about 180° C. to about 220° C. to a second temperature of about 430° C. to about 470° C. at a first heating rate of from about 20° C./hr to about 45° C./hr and at a first oxygen level of from about 5% by volume to about 13% by volume. Then, the green ceramic honeycomb body is heated from the second temperature to a third temperature of about 580° C. to about 620° C. at a second heating rate of from about 35° C./hr to about 90° C./hr and at a second oxygen level from about 12% by volume to about 20% by volume. In this firing schedule, the second heating rate is greater than the first heating rate, and the second oxygen level is greater than the first oxygen level. Further, oxygen is introduced into the kiln to increase an oxygen level of the kiln from the first oxygen level to the second oxygen level near a peak of organic volatile release, and the green ceramic honeycomb body has a diameter from about 8 inches to about 15 inches, and an aspect ratio from about 0.4 to about 1.5.

EXAMPLES

Embodiments will be further clarified by the following example.

Example

Numerous cordierite-forming green honeycomb bodies having dimensions of 11.5"×9.4", 14.3"×7.9", 10.5"×6.5", and 13.9"×6.5" were formed. Each of the green honeycomb bodies were heated to a first temperature of 200° C. at about 30° C./hour. Subsequently, the green honeycomb bodies were heated from the first temperature of 200° C. to a second temperature of 450° C. at the heating rates stated in Table 3 below. Within the heating stage from the first temperature to the second temperature, an oxygen level within the kiln was measured at 280° C., which was near the peak of volatile organic release and before additional oxygen was introduced into the kiln. Oxygen was then introduced into the kiln until the second temperature (450° C.) was reached. Once the second temperature was reached, the kiln was heated from the second temperature to a third temperature of 600° C. at the heating rates stated in Table 3 below. Within the heating stage from the second temperature to the third temperature, an oxygen level within the kiln was measured at 480° C. In each of the samples shown in Table 3, the average crack rate was less than or equal to 11%.

TABLE 3

| | Percent Cracks | | | | | Crack Matrix | | | |
| | | | | | | Heating | | Heating | |
| Sample | 11.5" × 9.4" | 14.3" × 7.9" | 10.5" × 6.5" | 13.9" × 6.5" | Overall Average | Rate 200° C.-450° C. | Oxygen 280° C. | Rate 450° C.-600° C. | Oxygen at 480 |
|---|---|---|---|---|---|---|---|---|---|
| 1 | 0 | 0 | 0 | 0 | 0 | 20 | 6.5 | 41 | 13 |
| 2 | 0 | 0 | 0 | 0 | 0 | 20 | 6.5 | 71 | 13 |
| 3 | 0 | 0 | 0 | 0 | 0 | 42 | 6.5 | 41 | 17 |
| 4 | 0 | 0 | 0 | 0 | 0 | 20 | 11.5 | 41 | 17 |
| 5 | 0 | 0 | 0 | 0 | 0 | 20 | 6.5 | 41 | 13 |
| 6 | 0 | 0 | 0 | 0 | 0 | 20 | 6.5 | 41 | 17 |
| 7 | 0 | 0 | 0 | 0 | 0 | 20 | 6.5 | 71 | 13 |
| 8 | 0 | 0 | 0 | 0 | 0 | 20 | 11.5 | 41 | 13 |
| 9 | 0 | 0 | 0 | 0 | 0 | 40 | 8.3 | 41 | 17 |
| 10 | 0 | 0 | 0 | 0 | 0 | 31 | 4 | 56 | 15 |
| 11 | 0 | 0 | 0 | 0 | 0 | 9 | 9 | 56 | 15 |
| 12 | 5 | 0 | 0 | 0 | 1 | 31 | 9 | 56 | 15 |
| 13 | 5 | 0 | 0 | 0 | 1 | 31 | 9 | 56 | 11 |

TABLE 3-continued

| | Percent Cracks | | | | Crack Matrix | | | |
|---|---|---|---|---|---|---|---|---|
| | | | | | Heating | | Heating | |
| Sample | 11.5" × 9.4" | 14.3" × 7.9" | 10.5" × 6.5" | 13.9" × 6.5" | Overall Average | Rate 200° C.-450° C. | Oxygen 280° C. | Rate 450° C.-600° C. | Oxygen at 480 |
| 14 | 5 | 0 | 0 | 0 | 1 | 31 | 9 | 86 | 15 |
| 15 | 0 | 6 | 0 | 0 | 1 | 20 | 11.5 | 71 | 13 |
| 16 | 0 | 6 | 0 | 0 | 1 | 20 | 6.5 | 71 | 17 |
| 17 | 0 | 6 | 0 | 0 | 1 | 42 | 11.5 | 41 | 17 |
| 18 | 0 | 0 | 7 | 0 | 2 | 20 | 6.5 | 71 | 17 |
| 19 | 5 | 6 | 0 | 0 | 3 | 42 | 11.5 | 41 | 13 |
| 20 | 0 | 11 | 0 | 0 | 3 | 42 | 6.5 | 41 | 17 |
| 21 | 0 | 11 | 0 | 0 | 3 | 20 | 11.5 | 71 | 17 |
| 22 | 0 | 11 | 0 | 0 | 3 | 20 | 11.5 | 41 | 13 |
| 23 | 0 | 11 | 0 | 0 | 3 | 42 | 11.5 | 41 | 17 |
| 24 | 0 | 6 | 0 | 6 | 3 | 20 | 11.5 | 41 | 17 |
| 25 | 5 | 0 | 7 | 0 | 3 | 20 | 6.5 | 41 | 17 |
| 26 | 5 | 0 | 7 | 0 | 3 | 31 | 9 | 26 | 15 |
| 27 | 10 | 6 | 0 | 0 | 4 | 20 | 11.5 | 71 | 13 |
| 28 | 5 | 11 | 0 | 0 | 4 | 42 | 11.5 | 41 | 13 |
| 29 | 5 | 0 | 7 | 6 | 5 | 31 | 9 | 56 | 19 |
| 30 | 5 | 11 | 0 | 6 | 6 | 42 | 11.5 | 71 | 17 |
| 31 | 0 | 0 | 14 | 13 | 7 | 31 | 9 | 56 | 15 |
| 32 | 20 | 0 | 7 | 0 | 7 | 31 | 9 | 56 | 15 |
| 33 | 10 | 11 | 0 | 6 | 7 | 20 | 11.5 | 71 | 17 |
| 34 | 5 | 17 | 7 | 0 | 7 | 42 | 11.5 | 71 | 17 |
| 35 | 5 | 22 | 0 | 6 | 8 | 42 | 6.5 | 41 | 13 |
| 36 | 5 | 33 | 0 | 0 | 10 | 42 | 6.5 | 41 | 13 |
| 37 | 5 | 33 | 0 | 0 | 10 | 42 | 6.5 | 71 | 17 |
| 38 | 5 | 39 | 0 | 0 | 11 | 42 | 6.5 | 71 | 17 |

Comparative Example 1

Numerous green cordierite ceramic honeycomb bodies having dimensions of 11.5"×9.4", 14.3"×7.9", 10.5"×6.5", and 13.9"×6.5" were formed. Each of the green cordierite ceramic honeycomb bodies were heated to a first temperature of 200° C. Subsequently, the green cordierite ceramic bodies were heated from the first temperature of 200° C. to a second temperature of 450° C. at the heating rates stated in Table 4 below. Within the heating stage from the first temperature to the second temperature, an oxygen level within the kiln was measured at 280° C., which was near the peak of volatile organic release and before additional oxygen was introduced into the kiln. Oxygen was then introduced into the kiln until the second temperature (450° C.) was reached. Once the second temperature was reached, the kiln was heated from the second temperature to a third temperature of 600° C. at the heating rates stated in Table 4 below. Within the heating stage from the second temperature to the third temperature, an oxygen level within the kiln was measured at 480° C. In each of the samples shown in Table 4, the average crack rate was greater than or equal to 18%.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for firing a green honeycomb body in a kiln, the method comprising:
   heating the green honeycomb body from a first temperature to a second temperature at a first heating rate and at a first oxygen level; and
   then heating the green honeycomb body from the second temperature to a third temperature at a second heating rate and at a second oxygen level, wherein
   the second heating rate is greater than the first heating rate,
   the second oxygen level is greater than the first oxygen level, and

TABLE 4

| | Percent Cracks | | | | Crack Matrix | | | |
|---|---|---|---|---|---|---|---|---|
| | | | | | Heating | | Heating | |
| Comp. Sample | 11.5" × 9.4" | 14.3" × 7.9" | 10.5" × 6.5" | 13.9" × 6.5" | Overall Average | Rate 200° C.-450° C. | Oxygen 280° C. | Rate 450° C.-600° C. | Oxygen at 480 |
| 1 | 25 | 0 | 14 | 31 | 18 | 31 | 14 | 56 | 15 |
| 2 | 5 | 50 | 36 | 6 | 24 | 42 | 11.5 | 71 | 13 |
| 3 | 5 | 50 | 43 | 6 | 26 | 42 | 11.5 | 71 | 13 |
| 4 | 20 | 50 | 43 | 6 | 30 | 53 | 9 | 56 | 15 |
| 5 | 20 | 50 | 43 | 19 | 33 | 42 | 6.5 | 71 | 13 |
| 6 | 30 | 61 | 50 | 25 | 42 | 42 | 6.5 | 71 | 13 | oxygen is introduced into the kiln to increase an oxygen level of the kiln from the first oxygen level to the second oxygen level near a peak of organic volatile release from the green honeycomb body.

2. The method according to claim 1, wherein the oxygen level of the kiln is maintained at the first oxygen level through the peak of organic volatile release.

3. The method according to claim 1, wherein the first oxygen level is from about 5% by volume to about 13% by volume.

4. The method according to claim 1, wherein the first oxygen level is from about 8% by volume to about 11% by volume.

5. The method according to claim 1, wherein the second oxygen level is from about 12% by volume to about 20% by volume.

6. The method according to claim 1, wherein the second oxygen level is from about 13% by volume to about 17% by volume.

7. The method according to claim 1, wherein the first heating rate is from about 20° C./hr to about 45° C./hr.

8. The method according to claim 1, wherein the first heating rate is from about 30° C./hr to about 42 C/hr.

9. The method according to claim 1, wherein the second heating rate is from about 35° C./hr to about 90° C./hr.

10. The method according to claim 1, wherein the second heating rate is from about 40° C./hr to about 70° C./hr.

11. The method according to claim 1, wherein the first temperature is from about 180° C. to about 220° C.

12. The method according to claim 1, wherein the second temperature is from about 430° C. to about 470° C.

13. The method according to claim 1, wherein the third temperature is from about 580° C. to about 620° C.

14. The method according to claim 1, wherein the green ceramic honeycomb body has a diameter from about 8 inches to about 15 inches, and an aspect ratio from about 0.4 to about 1.5.

15. The method according to claim 1, wherein oxygen is introduced into the kiln at a kiln temperature of from about 260° C. to about 300° C. to increase the oxygen level of the kiln from the first oxygen level to the second oxygen level.

16. The method of claim 1, wherein near the peak of organic volatile release from the green honeycomb body comprises a point where the organic volatile release has reached its peak and returned to a point that is from about 80% to about 50% of the peak.

17. A method for firing a green honeycomb body in a kiln, the method comprising:
heating the green ceramic honeycomb body from a first temperature of about 180° C. to about 220° C. to a second temperature of about 430° C. to about 470° C. at a first heating rate of from about 20° C./hr to about 45° C./hr and at a first oxygen level of from about 5% by volume to about 13% by volume; and
heating the green ceramic honeycomb body from the second temperature to a third temperature of about 580° C. to about 620° C. at a second heating rate of from about 35° C./hr to about 90° C./hr and at a second oxygen level from about 12% by volume to about 20% by volume, wherein
the second heating rate is greater than the first heating rate,
the second oxygen level is greater than the first oxygen level,
oxygen is introduced into the kiln to increase an oxygen level of the kiln from the first oxygen level to the second oxygen level near a peak of organic volatile release from the green honeycomb body, and
the green ceramic honeycomb body has a diameter from about 8 inches to about 15 inches, and an aspect ratio from about 0.4 to about 1.5.

18. The method according to claim 17, wherein the oxygen level of the kiln is maintained at the first oxygen level through the peak of organic volatile release.

19. The method according to claim 17, wherein the first oxygen level is from about 8% by volume to about 11% by volume.

20. The method according to claim 17, wherein the second oxygen level is form about 13% by volume to about 17% by volume.

21. The method according to claim 17, wherein oxygen is introduced into the kiln at a kiln temperature of from about 260° C. to about 300° C. to increase the oxygen level of the kiln from the first oxygen level to the second oxygen level.

22. A method for firing a green body in a kiln, the method comprising:
heating the green body from T1 (200° C.) to T2 (280° C.) below a first oxygen level O1 until the peak in organic volatile release;
then heating the green body from T2 (280° C.) to T3 (450° C.) and increasing oxygen from O1 to O2;
then heating the green body from T3 (450° C.) to T4 (580° C.),
wherein the heating from T1 (200° C.) to T3 (450° C.) is at a first heating rate and the heating from T3 (450° C.) to T4 (580° C.) is at a second heating rate greater than the first heating rate.

23. The method of claim 22 further comprising subsequently heating the green body at temperatures and times sufficient to convert the green body into a ceramic body.

* * * * *